United States Patent [19]

Meinke

[11] 4,337,981

[45] Jul. 6, 1982

[54] DRIVE AND SUPPORT ARRANGEMENT FOR A DISC-SHAPED ROTOR

[76] Inventor: Peter Meinke, Sulzberg 7, 8061 Grossinzemoos, Fed. Rep. of Germany

[21] Appl. No.: 70,334

[22] Filed: Aug. 27, 1979

Related U.S. Application Data

[63] Continuation of Ser. No. 860,737, Dec. 14, 1977, abandoned, which is a continuation of Ser. No. 601,705, Aug. 4, 1975, abandoned.

[30] Foreign Application Priority Data

Aug. 5, 1974 [DE] Fed. Rep. of Germany ....... 2437667

[51] Int. Cl.³ ............................................ F16C 39/06
[52] U.S. Cl. .................................................... 308/10
[58] Field of Search ......................... 308/10; 324/151

[56] References Cited

U.S. PATENT DOCUMENTS 3,356,425 12/1967 Carriere .............................. 308/10
3,890,019 6/1975 Boden ................................. 308/10
4,076,340 2/1978 Meinke ............................... 308/10

Primary Examiner—R. Skudy
Attorney, Agent, or Firm—Scully, Scott, Murphy & Presser

[57] ABSTRACT

A drive arrangement for a rotor which facilitates the rapid and convenient exchange of the rotor in that a magnetic coil system is located along the conical circumferential surface of the rotor, whose inner surface forms an air gap with the conical circumferential surface of the rotor of an essentially uniform width. This magnetic coil system, on the one hand, serves for the generation of a magnetic field oriented inclined relative to the rotor aixs, and whose adjusting effect causes the rotor to maintain the prescribed air gap without contact, while the coil system additionally serves to provide a magnetic rotational field which drives the rotor.

5 Claims, 1 Drawing Figure

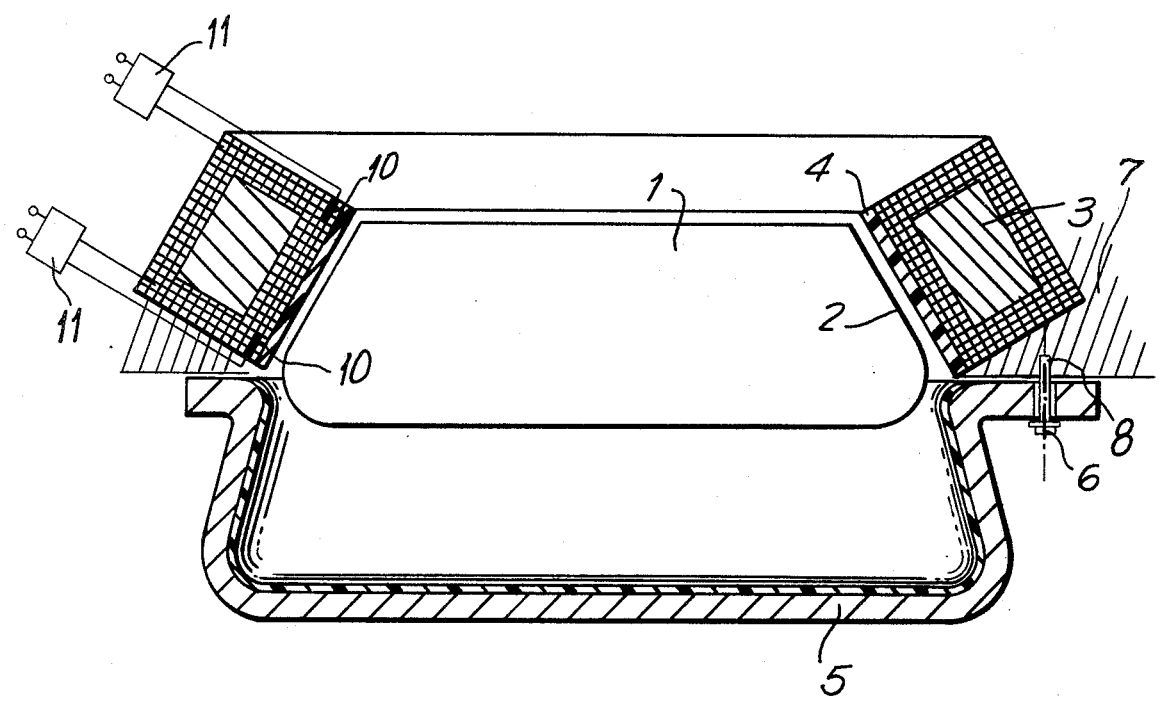

DRIVE AND SUPPORT ARRANGEMENT FOR A DISC-SHAPED ROTOR

This is a Rule 60 continuation of my co-pending Rule 60 continuation application, U.S. Ser. No. 860,737 filed Dec. 14, 1977 which in turn is a Rule 60 Continuation of U.S. Ser. No. 601,705 filed Aug. 4, 1975, both now abandoned.

FIELD OF THE INVENTION

The present invention relates to a drive and support arrangement for a disc-shaped rotor and, more particularly, a spinning centrifuge having a conically-extending circumferential surface.

DISCUSSION OF THE PRIOR ART

Heretofore, disc-shaped rotors, in particular, rotors of spinning centrifuges whose external surface extends conically, and which must be accessible from one side thereof for additional apparatus which are important to the process, had to be supported in an overhung relationship within a ball bearing. This rigid support evidences the disadvantage that the rotors must be balanced extremely accurately since any inbalance leads to increased bearing wear and thereby to the premature failure of the support.

Spinning centrifuge rotors must be cleaned a number of times during each day in order to obtain a spinning product which remains uniform. Since it is extraordinarily difficult to dismount a rotor in the present supports, and inasmuch as the main cost item of a rotor consists of the components which are necessary for the support thereof, a filthied rotor which is in need of cleaning has heretofore not been exchanged with a second rotor, but has been again cleaned and reassembled at the spinning location so as to hereby render inactive daily, for a considerable time period, a spinning location.

SUMMARY OF THE INVENTION

Accordingly, it is an object of the present invention to provide a support and a drive arrangement for a rotor, which allows for the utilization of an extremely simple and expensive rotor.

It is a further object of the present invention to provide a support and a drive arrangement for a rotor which facilitates the rapid and convenient exchange of the rotor.

The foregoing object is inventively achieved in that a magnetic coil system is located along the conical circumferential surface of the rotor, whose inner surface forms an air gap with the conical circumferential surface of the rotor of an essentially uniform width. This magnetic coil system, on the one hand, serves for the generation of a magnetic field oriented inclined relative to the rotor axis, and whose adjusting effect causes the rotor to maintain the prescribed air gap without contact, while the coil system additionally serves to provide a magnetic rotational field which drives the rotor. Hereby, there is thus formed a rotor for the drive of which there are set no further requirements on the rotor, except that the latter provides a ferromagnetic material in the regions serving for the support and drive thereof. In particular in such a rotor, complex and expensive support installations becomes superfluous, while in the remainder the rotor is only magnetically supported within the coil system so that after switching off the currents which generate the magnetic fields, the rotor may, at any time, be removed manually. Additionally, the inventive rotor need no longer be centered with any extreme care as in the case with previous rotors, since it adjusts itself in an increasing manner about its main support axis with an increasing rotational speed so that, for example, during lop sided loading of the rotor during an operating process, this will not effectuate itself in an increased bearing force and increased bearing wear, but only in a permissible displacement or shift of the main supporting axis.

These types of magnetic coils, if necessary are driven by means of measuring sensors and a regulating installation, wherein the measuring sensors receive the position of the rotor and, at positional errors, cause the magnetic coils through their adjustive effect to exert a corrective effect on the rotor.

It is, however, also contemplative that the circumferential groove of the rotor itself forms a permanent magnet and that there be created a stationary magnetic field in the magnetic coil system in addition to the peripheral rotational field which serves for the drive, which is produced either by the magnetic coils or by a permanent magnetic ring magnet, whose polarity is the same as that of the rotor. A rotor having a vertical axis, whose external wall surface reduces conically downwardly, is supported in a contactless manner in that type of bearing. Quite apparently are there areas of application in which that type of construction is of advantage.

In particular, in the utilization in a spinning centrifuge, it is of advantage, however, that the rotor axis be oriented essentially vertically, and that the rotor evidences at smaller diameter at its upper end than at its lower end. Hereby, the rotor depends on an inventive constructional component which serves for its drive and its support, in effect, the rotor is maintained in its position through attractive magnetic forces. For this purpose there is required a known bearing regulating arrangement which possesses, however, the particular advantage that, for example, it damps respectively, suppresses rotor vibrations occurring upon the passing through of critical rotational speeds. Moreover, this construction corresponds to the usual and previously utilized form of spinning centrifuge rotors employed in the technical processing portion of the installation.

A further feature of the invention consists of in that the ring coil system for the drive and support coils possesses a common core. There is hereby afforded a constructively simple, elegant and, in general, much less expensive construction for the invention.

A further feature of the invention consists of in that there may be used for the drive and support at least a section of the same coils. When, for example, the drive frequencies from the necessary adjusting frequencies, which result from the disruptive vibrations of the rotor, are generally different, then in a simple embodiment of this feature, the same coil system is concurrently controllable by means of drive and adjusting currents, for example, through filter devices. The advantage of this construction lies in the particularly simple configuration of the coil system. Since for rapidly running rotors, even at careful material testing, bursting cannot be avoided upon occasion due to high centrifugal forces, to a certain degree the magnetic coil system acts as an armor with regard to the fractured segments of the rotor whereby, if the magnetic coil system is destroyed, the proposed construction is of advantage in that an inexpensive coil system is driven by means of a more complex control arrangement.

A further novel aspect of the invention resides in that the magnetic coil system has the position-measuring sensors built in. It is namely possible, and in particular instance of positive advantage, to provide measuring sensors for positioned measurement which do not measure in the support plane, while due to the inclined position of the bearing forces relative to the rotor axis it is, however, of particular advantage to effectuate the measurement of the position essentially in the support plane, whereby it is particularly advantageous to incorporate in a unitary construction the measuring sensors within the magnetic coil system.

Hereby, by means of the measuring sensors, there are determined not only radial but also axial vibrations or oscillations, which are suppressed in the same manner. It is hereby possible that there be utilized as measuring sensors also portions of the drive and/or adjusting coils.

An embodiment of the invention consists of a herein-described magnetic coil system, wherein a free or clear width thereof is detachably closed off by means of a cover. This cover, for example, due to a lack of the adjusting current, such as through switching off or current failure, prevents the rotor from dropping downwardly out of the magnetic coil system as long as it still rotates. Through the intermediary of a simple arrangement, this cover is detachable so that, by means of a few simple manipulations, the rotor can be exchanged at any time.

A further feature of the invention consists in the cover being provided with a downwardly directed curvature or recess. The sidewalls of this recess hereby can extend either cylindrically or even conically so as to permit that, upon failure of the adjusting current, the rotor drops into the recess and is prevented, by means of the perpendicular, or inclinedly oriented sidewalls, from again sliding upwardly and to damage the coil system, while, in a similar manner, the inventive recess serves for receiving splinters since, due to the inclined inner walls of a magnetic coil system, any encountered fragments of the rotor are immediately deflected downwardly into the cover recess.

A further feature of the invention consists in that the cover being provided with a coating having sliding or low-friction properties. Those types of coatings are known in the technology, for example, a coating of a plastic material such as Teflon, phosphate or the like. Hereby, upon failure of the current, there is effected that the rotor, without incurring any damage, slides along the low-friction layer until standstill. It is also possible, in this construction, that upon the braking of the rotor, such as for the purpose of exchange, to purposely permit the rotor to drop downwardly through a current shutoff, so as to thereby shorten the braking time.

A further embodiment of the invention consists of the internal surface of the magnetic coil system being provided with a coating having sliding or low-friction properties. Hereby is effectuated that the rotor may run up against the magnetic coil system without encountering any damage, in essence, a type of contact may occur, for instance, when the rotor is inadvertently overloaded lopsidedly.

BRIEF DESCRIPTION OF THE DRAWING

The single FIGURE of the drawings shows a transverse elevational sectional view of the rotor and a cross-section of the coil with sensors embedded therein.

DETAILED DESCRIPTION

As shown in FIG. 1, a spinning centrifuge rotor 1 having conically inwardly curving side surfaces is encompassed along these side surfaces by a magnetic coil system 3 whose inner surface is provided with a coating formed of a material with suitable frictional properties known, for example, under the commercial name "Teflon". Located below the magnetic coil system is a dish-shaped cover 5 which is similarly coated with Teflon on its inner side, and which is pivotable about an axis 6 with respect to a housing 7. The cover is detachable by means of a simple screw arrangement 8. Above the opening of the rotor 1 there is located a suitable installation (not shown) for the introduction of a spinning thread into the rotor. The magnetic coil system 3 is controlled hereby by means of a suitable and known drive and regulating arrangement (not shown). The magnetic coil system 3 includes measuring sensors 10 connected to controllers 11.

When the rotor 1 in operation must be cleaned, then the rotational driving field in the magnetic coil system 3 is deactivated, or, so reversed as to exert a braking effect on the rotor. When the rotor has attained at a time a predetermined speed which allows it to slide into the recess of the cover 5 without sustaining any damage, then the adjusting current for the magnetic coil system 3 is switched off, and the rotor 1 drops downwardly into the recess of the cover 5, where it brakes along the Teflon-coated surface without encountering any damage. During this procedure the cover may be already pivoted outwardly from which the rotor, which in the interim has been rendered stationary, may be removed and replaced by a new rotor. The collected rotors need not, as previously, be cleaned by hand, but can be cleaned commercially in a central mechanical washing installation. The cover, together with the new rotor, is then again swung back into its original position, and thereafter the adjusting field is activated so as to bring the rotor upwardly into an operating position. Finally, the drive current is again switched in so as to generate a rotational field which will again set the rotor into rotation. It may be ascertained that for the necessary servicing of a spinning location, there is presently required hardly any more time than would be needed for the deceleration, or, acceleration of the spinning centrifuge.

What is claimed is:

1. An improved combined drive and support apparatus comprising a disc-shaped rotor provided with ferromagnetic materials, having a major vertical axis and a conical peripheral surface provided with a smaller diameter at its upper end, said apparatus being further defined by, a ring-shaped stationary member encompassing said conical peripheral surface of said rotor; said ring-shaped stationary member having an inner surface facing said conical peripheral surface, said inner surface and said conical surface being separated in use by a uniform air gap; the improvement comprising: providing said stationary member with magnetic coil means having drive and support coils formed of a common core for producing a rotating magnetic field for driving said rotor and additionally providing a magnetic field oriented and inclined relative to the rotor axis for positioning said rotor, and measuring sensor means within said magnetic coil formed by said stationary member for measuring the position of the rotor, whereby said rotor is accessible at least one end and is supported in a contactless manner by magnetic forces created by said magnetic coil means.

2. An arrangement as claimed in claim 1, wherein: cover means being positioned below said stationary member for detachably closing the opening thereof.

3. An arrangement as claimed in claim 2, wherein: said cover means comprises a downwardly directed recess.

4. An arrangement as claimed in claim 2, wherein: said cover being provided with a coating of low-friction material.

5. An arrangement as claimed in claim 1, wherein: said conical interior surface being provided with a coating of low-friction material.

* * * * *